(12) United States Patent
Engfer et al.

(10) Patent No.: US 6,347,845 B1
(45) Date of Patent: Feb. 19, 2002

(54) BRAKE SYSTEM FOR VEHICLES

(75) Inventors: Ortwin Engfer, Stuttgart; Werner Wilde, Schwieberdingen; Herbert Keller, Wiernsheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,674
(22) PCT Filed: Jul. 23, 1998
(86) PCT No.: PCT/DE98/02066
§ 371 Date: Jul. 28, 2000
§ 102(e) Date: Jul. 28, 2000
(87) PCT Pub. No.: WO99/30943
PCT Pub. Date: Jun. 24, 1999

(30) Foreign Application Priority Data

Dec. 16, 1997 (DE) .......................................... 197 55 821

(51) Int. Cl.$^7$ ................................................. B60T 8/36
(52) U.S. Cl. ................................ 303/119.3; 303/113.1; 303/DIG. 10
(58) Field of Search ..................... 303/DIG. 10, DIG. 4, 303/119.3, 113.1

(56) References Cited

U.S. PATENT DOCUMENTS

| | | | | |
|---|---|---|---|---|
| 4,796,958 A | * | 1/1989 | Brown .................... | 303/113.1 |
| 5,429,425 A | * | 7/1995 | Drott ........................ | 303/3 |
| 5,443,306 A | * | 8/1995 | Broome ..................... | 303/3 |
| 5,685,617 A | * | 11/1997 | Hio et al. ................ | 303/113.1 |
| 5,688,028 A | * | 11/1997 | Kohno et al. ............ | 303/116.4 |
| 5,988,771 A | * | 11/1999 | Sakamoto et al. ....... | 303/119.3 |

* cited by examiner

Primary Examiner—Robert J. Oberleitner
Assistant Examiner—Devon Kramer
(74) Attorney, Agent, or Firm—Ronald E. Greigg

(57) ABSTRACT

A brake system for vehicles, in particular for motor vehicles, has electrically controlled hydraulic final control elements, integrated in a hydraulic block; a pressure sensor with a plurality of pressure measuring elements for measuring the hydraulic pressure controlled by the individual final control elements; and a control circuit for controlling the final control elements. For the sake of simple and secure mounting of the hydraulic block, pressure sensor and control circuit, the control circuit and pressure sensor are accommodated in a common housing of an add-on electronic control unit (ECU), from whose underside the pressure measuring elements protrude with smaller-diameter plug-in tubes. When the add-on ECU and hydraulic block are installed, and that the housing is mounted on the hydraulic block and solidly joined to it by insertion of the plug-in tubes into the fluid conduits, present in the hydraulic block, in a fluid-tight manner.

22 Claims, 5 Drawing Sheets

US 6,347,845 B1

BRAKE SYSTEM FOR VEHICLES

BACKGROUND OF THE INVENTION

1. Field of the Invention

The invention is based on a brake system for vehicles, in particular to an improved brake system for motor vehicles.

2. Description of the Prior Art

In a known brake system of this type (German Patent Disclosure DE 195 21 832 A1), the pressure measuring elements are combined in a sensor plate, which is screwed to the hydraulic block by means of screws passed through screw holes in the sensor plate. The measuring diaphragms of the individual pressure measuring elements, which in conjunction with the gauge form the pressure measuring element, are each acted upon by fluid via a respective fluid conduit. For sealing purposes, a sealing plate is placed between the sensor plate and the hydraulic block. The strain gauges are disposed on the surface of the measuring diaphragm and are electrically conductively connected to an evaluation circuit. The evaluation circuit is mounted on a flat double-T-shaped carrier, which is screwed to the hydraulic block, extending a slight distance above the sensor plate. The evaluation circuit can evaluate the resistances of the strain gauges of all the pressure measuring elements separately, for instance by multiplexing. The evaluation circuit is connected to the control unit via the cable harness of the electrical system.

SUMMARY

The brake system of the invention has the advantage that by integrating the pressure sensor and the control unit, only a single housing is needed, and the electrical connection between the pressure sensor and the control unit can be made over the shortest distance and in a protected way inside the housing. The electrical connection among pressure measuring elements, signal processing and the control unit computer can be done on one level by bonded connections and hybrid technology, thus achieving greater security against failure and requiring fewer components. Installation is simple, because the housing is merely joined to the hydraulic block, that is, put in place and secured. The complicated installation step of connecting the individual pressure connections of the pressure sensor to the hydraulic block that is otherwise customary is omitted, since this is achieved automatically and very simply in the joining operation. By means of the small-diameter plug-in tubes of the pressure measuring elements, the pressure measurement takes place in a straight conduit, and because of the small tube diameter, only turbulence arises in the conduit through which fluid flows, thus considerably increasing the accuracy of detection of the controlled brake pressure. The long plug-in tubes also assure compensation for tolerances transversely to the longitudinal direction of the plug-in tubes when the housing and the hydraulic block are joined to one another.

In a preferred embodiment of the invention, the pressure measuring elements are disposed side by side on a carrier and are inserted, each with a collar coaxially surrounding the plug-in tube, into stepped bores embodied in the carrier. By means of wedging segments protruding radially from the underside of the collar, the pressure measuring elements are wedged into the carrier on its underside. By these structural provisions, simple fastening of the pressure measuring elements by wedging is possible. The collar fixes each of the pressure measuring elements in their position, so as to achieve the requisite angular precision. The undercut on the lower end of the collar prevents the forces arising from the wedging from reaching the region of the pressure measuring cell and adulterating the measurement signal.

In an advantageous embodiment of the invention, the sealing off of the plug-in tubes, protruding into the fluid conduits of the hydraulic block, of the pressure measuring elements is done in each case by means of two O-rings, slipped onto the plug-in tube and which O-rings are disposed on both sides of a support disk coaxially surround the plug-in tube. This double-O-ring seal not only serves to seal off the fluid conduits but also makes it possible to compensate for tolerances in the axial direction between the housing and the hydraulic block when these two components are joined.

In an advantageous embodiment of the invention, radial bores discharging into the fluid conduits are made in the hydraulic block, and the ends of the plug-in tubes of the pressure measuring elements are passed through these bores. One trap funnel is inserted into each of the openings of the radial bores at the surface of the hydraulic block. This trap funnel makes it easier to insert the respective plug-in tube into the fluid conduits positionally correctly and at the same time serves to hold down the double-O ring seal.

BRIEF DESCRIPTION OF THE DRAWINGS

The invention is described in further detail below in terms of an exemplary embodiment as shown in the drawings, in which.

DESCRIPTION OF THE PREFERRED EMBODIMENT

Figure 1:
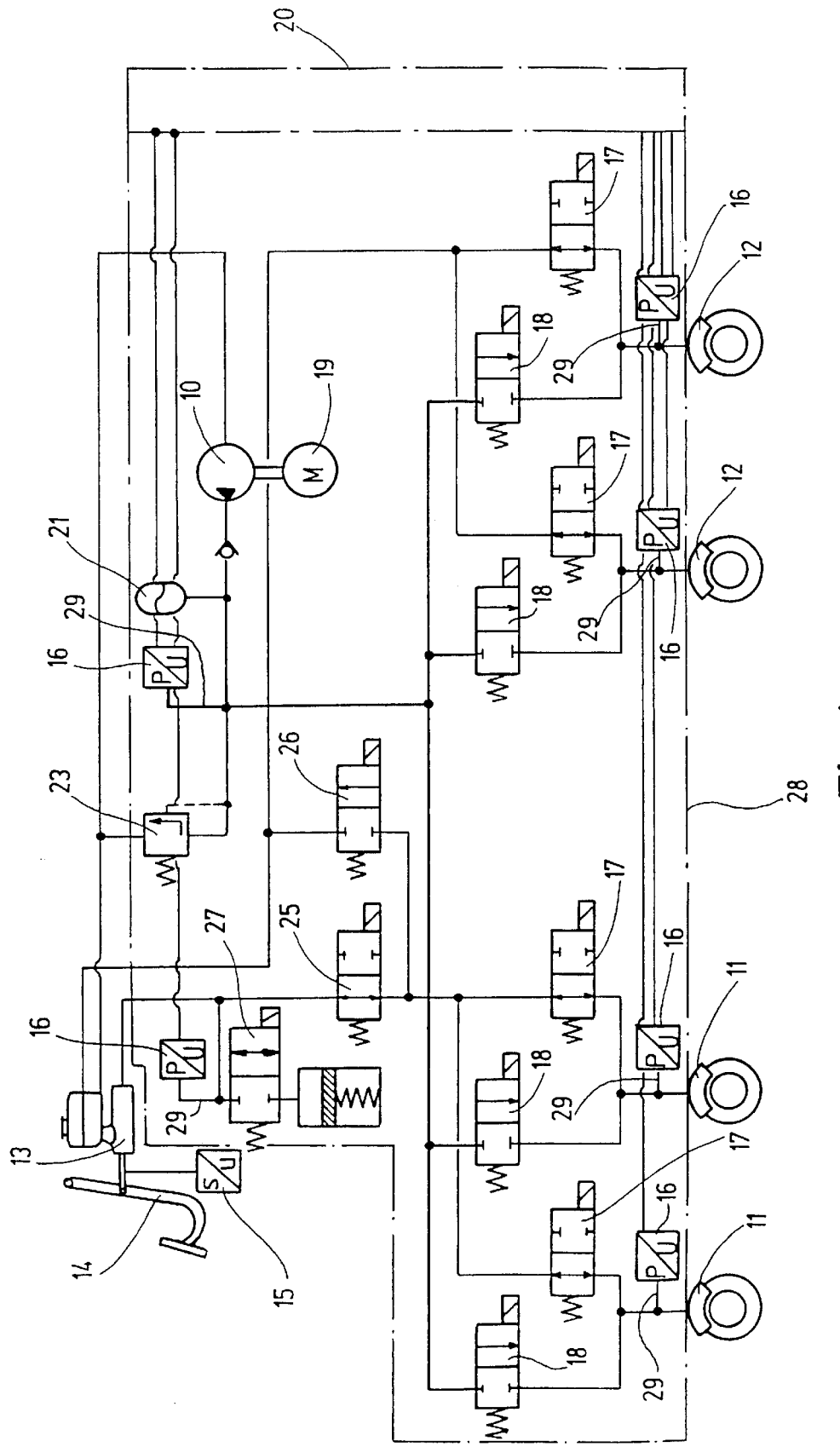
FIG. 1 is a block circuit diagram of a brake system with a hydraulic block and a add-on electronic control unit (ECU)

In FIG. 1, a hydraulic vehicle brake system of the kind known for instance from DE 195 21 832 A1 is shown as a block circuit diagram. The vehicle brake system has two brake systems that supplement one another, namely a service brake system, which generates brake fluid pressure by means of a hydraulic pump 10 and acts on wheel brake cylinders 11, 12 of all the vehicle wheels, and an auxiliary brake system, which draws it brake fluid pressure from a pedal-actuated master cylinder 13 that acts only on the wheel brake cylinders 11 of two vehicle wheels of one axle. Each wheel brake cylinder 11, 12 has a first shutoff valve 17 that is open in the basic position and a second shutoff valve 18 that is closed in the basic position. Upon actuation of the brake pedal 14 of the master cylinder 13, a pedal position sensor 15 and pressure measuring element 16 output an electrical signal to a control circuit 22, suggested in FIG. 3, in an add-on electronic control unit (ECU) 20 that controls all the shutoff valves 17, 18, further shutoff valves 25–27, and an electric pump motor 19. If the service brake system is intact, the shutoff valve 27 is opened, the shutoff valves 17 and 25 are closed, and the shutoff valve 26 is opened. The second shutoff valves 18 are opened and in this way the wheel brake cylinders 11, 12 are acted upon by pressure from a hydraulic reservoir 21, which in turn is put under pressure by the hydraulic pump 10. The pressure in the hydraulic reservoir 21 is monitored by a further pressure measuring element 16. A pressure limiting valve 23 protects the hydraulic reservoir 21 against overload. When a brake fluid pressure is reached in the wheel brake cylinders 11, 12 that is dependent on the pressure generated in the master cylinder 13, the second shutoff valves 18 are closed. The first shutoff valves 17 are closed, as noted, so that no brake fluid from the wheel brake cylinders 11, 12 can escape through them during braking. The brake fluid pressure in the wheel brake cylinders 11, 12 is detected by means of further pressure measuring elements 16. The hydraulic pump 10, hydraulic reservoir 21, pressure limiting valve 23 and shutoff valves 17, 18 are combined, together with the further magnet valves 25–27 of the auxiliary brake system, in a hydraulic block 28, on which the add-on ECU 20 is placed. The hydraulic block 28 and add-on ECU 20 are symbolized in FIG. 1 by dot-dashed outline. The pressure measuring elements 16 communicate with the hydraulic lines in the hydraulic block 28 via fluid conduits 29, and they are combined in a pressure sensor 30 (FIG. 5), which together with the control circuit 22 for the various final control elements of the hydraulic block 28, such as the shutoff valves 17, 18 embodied as 2/2-way magnet valves and the further magnet valves 25–27, is accommodated in a common housing 31 of the add-on ECU 20.

Figure 2:
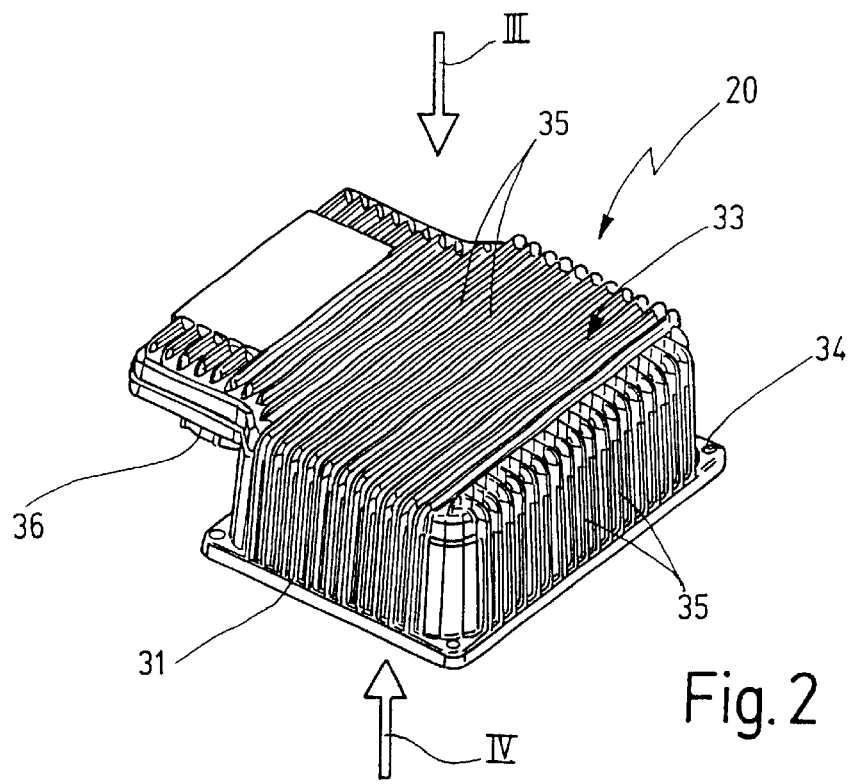
FIG. 2 is an perspective view of the add-on ECU of FIG. 1.
Figure 3:
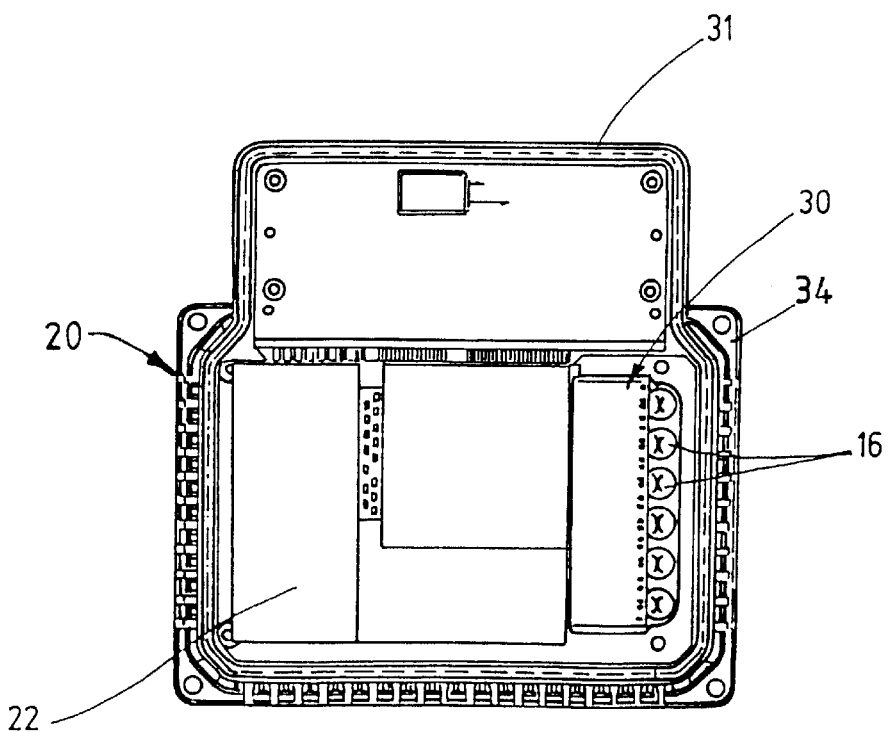
FIG. 3 is a view of the add-on ECU in the direction of arrow III in FIG. 2 with the cap removed.
Figure 4:
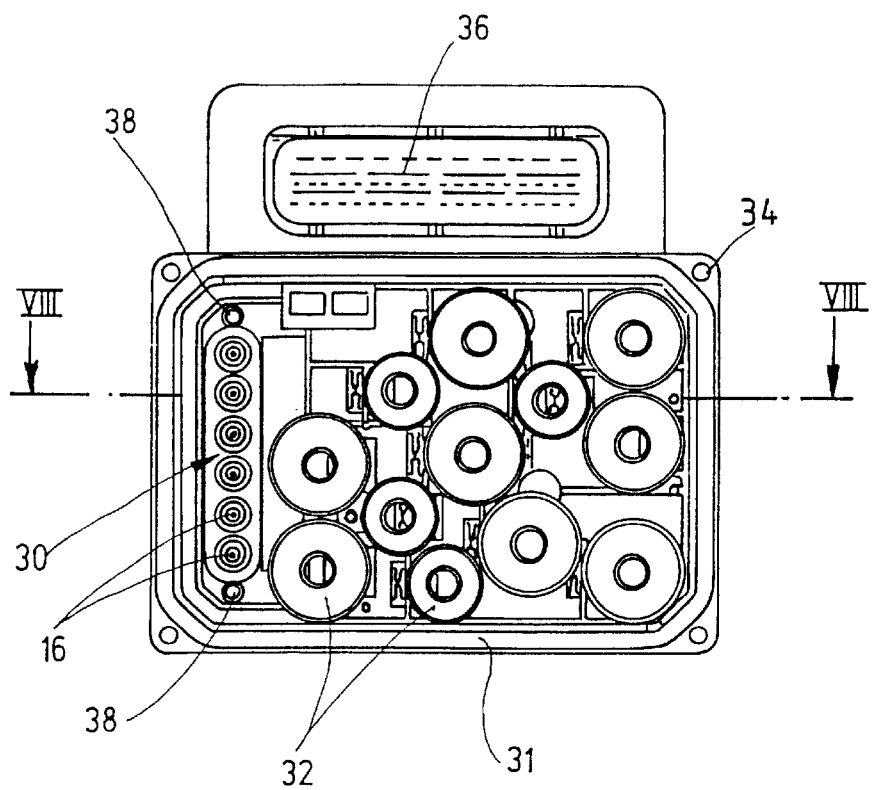
FIG. 4 is a view of the add-on ECU from below in the direction of the arrow IV in FIG. 2.

The add-on ECU 20 is shown in perspective in FIG. 2, in a plan view with the cap removed in FIG. 3, and in a view from below in FIG. 4; in this last view, the magnet coils 32 of the various valves 17, 18, 25–27 disposed in the hydraulic block 28 can be seen; these coils are likewise integrated with the add-on ECU 20. The housing 31 is closed at the top with a detachable cap 33 and has a fastening flange 34, with which the add-on ECU 20 is screwed to the hydraulic block 28. The housing 31 and cap 33 are provided with cooling fins 35 on the outside. Besides the control circuit 22 and the pressure sensor 30, a connection plug 36 for connecting the add-on ECU 20 to the vehicle electrical system is also present in the housing 31.

Figure 5:
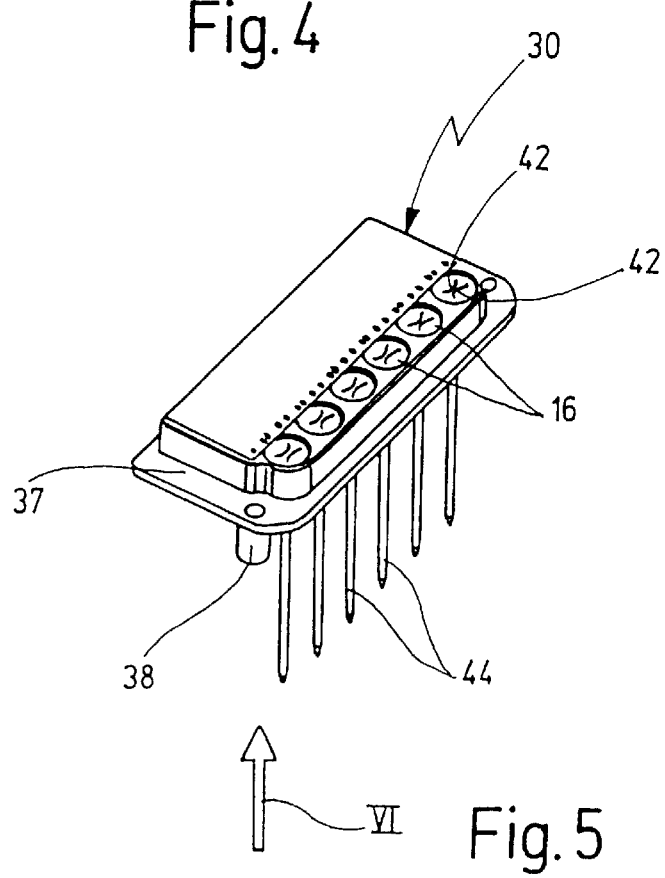
FIG. 5 is a perspective view of a pressure sensor in the add-on ECU of FIGS. 2–4.
Figure 6:
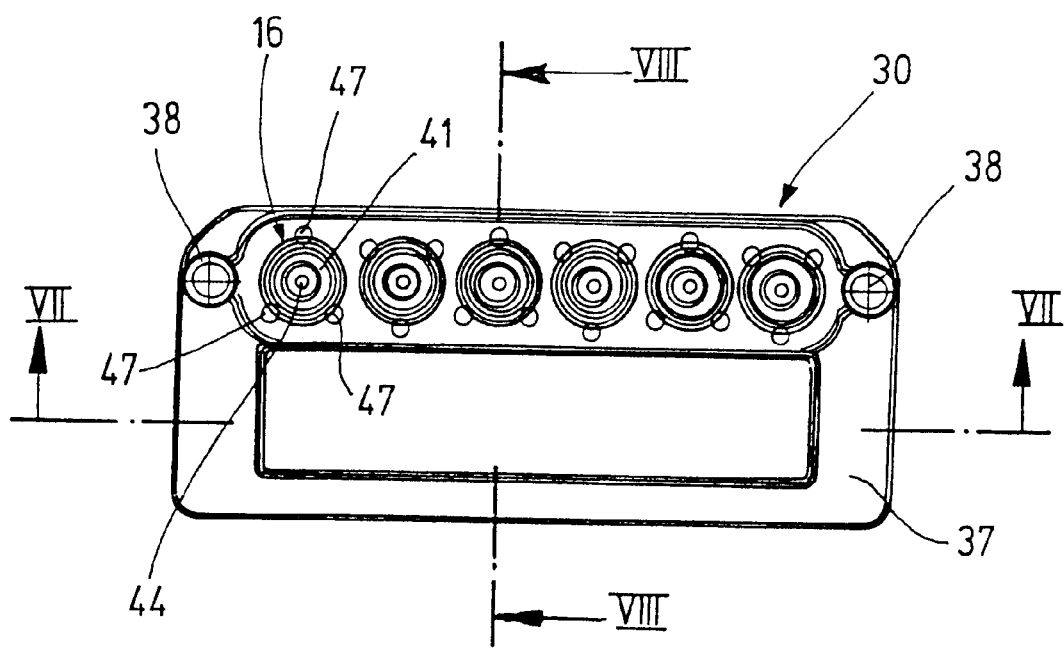
FIG. 6 is a view of the pressure sensor from below in the direction of the arrow VI in FIG. 5.
Figure 7:
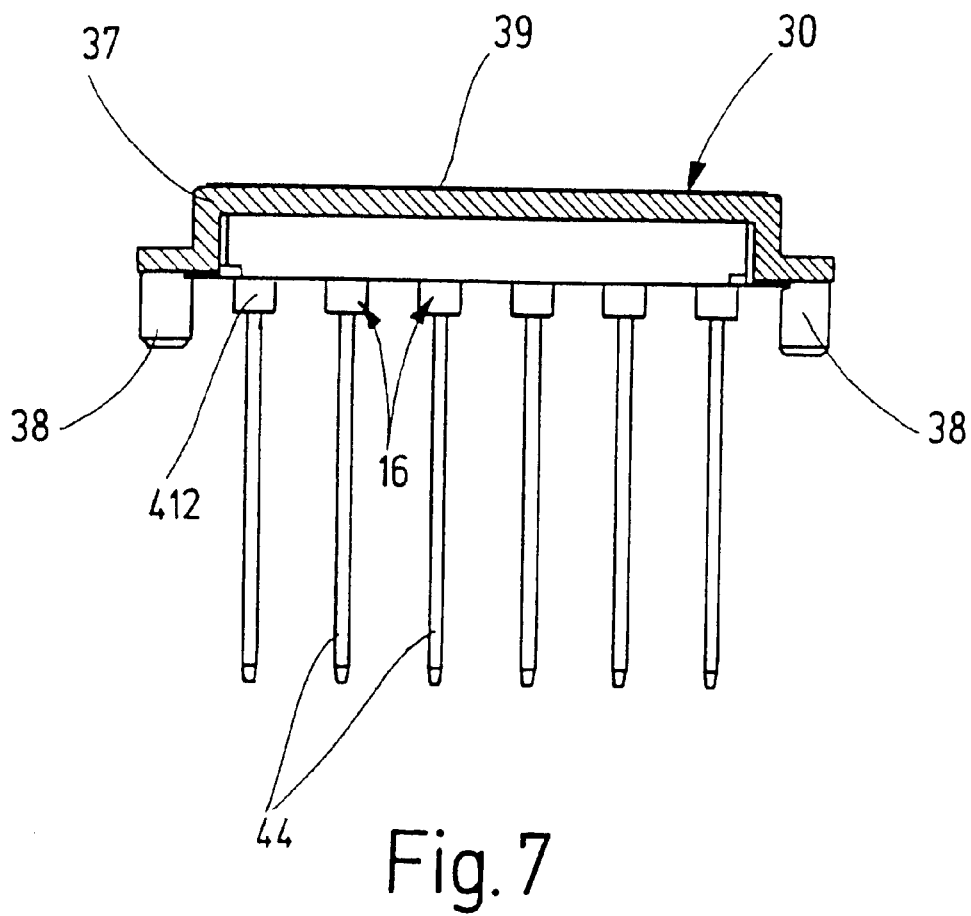
FIG. 7 is a section taken along the line VII—VII of FIG. 6, rotated by 180°.

The pressure sensor 30 shown in FIGS. 5–7 contains all six pressure measuring elements 16 of the brake system in FIG. 1; these pressure measuring elements are disposed side by side on a carrier 37. The carrier 37 is inserted into the housing 31 by means of two downward- protruding molded pegs 38 and secured in the housing, for instance being screwed.

Figure 8:
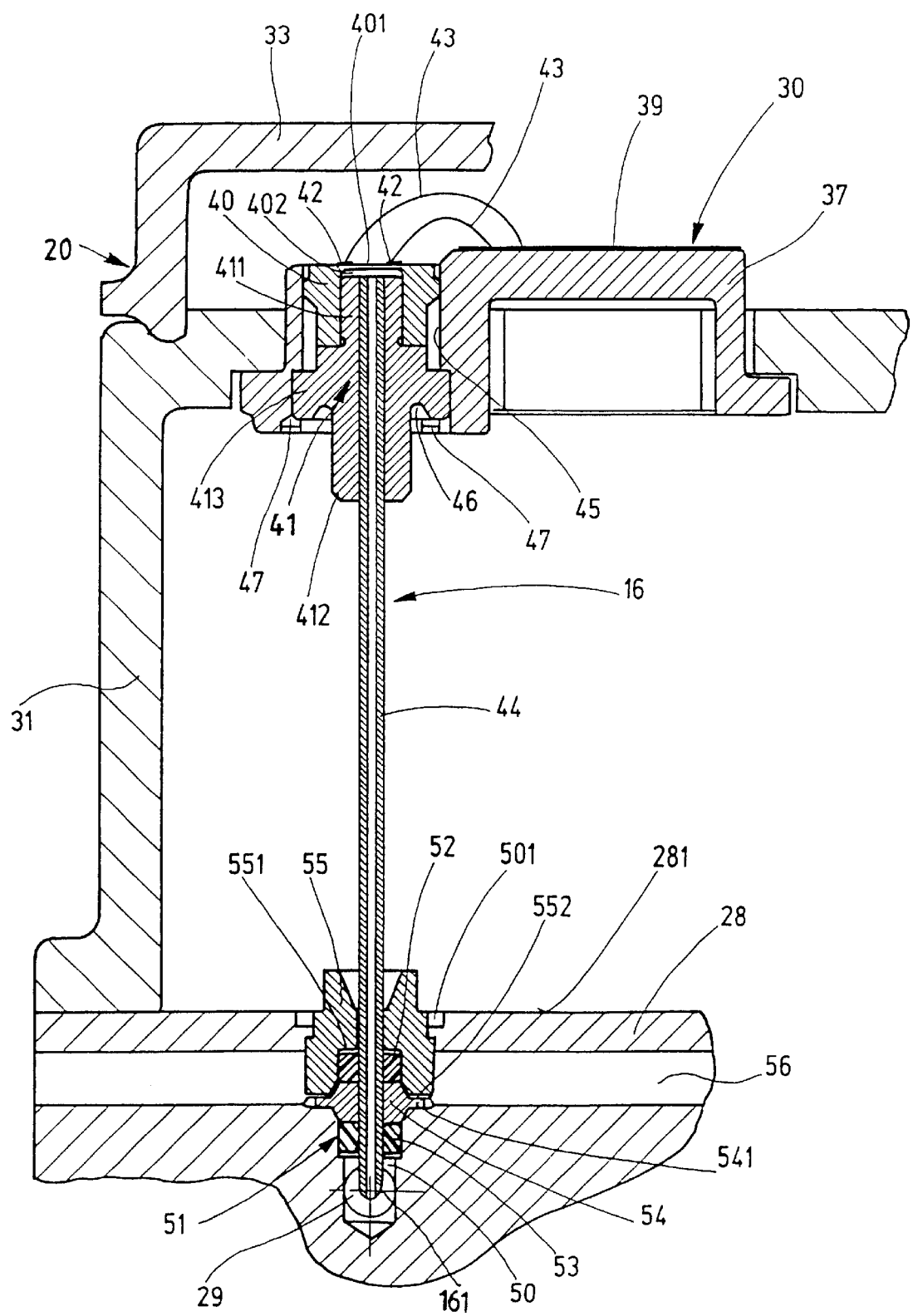
FIG. 8 is a fragmentary longitudinal section of the hydraulic block and add-on ECU taken along the line VIII—VIII in FIG. 4 or FIG. 6, the latter rotated 90° clockwise.

One pressure measuring element 16 is shown in FIG. 8 in longitudinal section. It includes a caplike measuring cell 40, which is placed in a fluid-tight manner on a hollow peg 411 of a carrier body 41, and whose center forms a measuring diaphragm 401. On the top of the measuring cell 40 and thus on the measuring diaphragm 401, strain gauges 42 are applied by thin-film, thick-film or foil technology; they are connected to an evaluation circuit 39 disposed on the surface of the carrier 37. The connection wires are marked 43 in FIG. 8. Overall, the electrical connection between the pressure measuring elements 16 and the evaluation circuit 29 as well as the control circuit 22 and optionally among component units of the control circuit 22 is effected on a spatial level by bonded connections and hybrid technology. Between the measuring diaphragm 401 of the measuring cell 40 and the face end toward it of the hollow peg 411, a pressure measuring chamber 402 remains, into which a very long, small-diameter, pressure carrying plug-in tube 44 that is secured coaxially in the carrier body 41 is guided. The plug-in tube 44, whose dimensions are optimized, is approximately 60 mm long and has an outside diameter of 1.6 mm and an inside diameter of 0.63 mm, and on the underside of the carrier body 41, in a portion where it emerges from the carrier body 41, it is surrounded by an annular collar 412 of the carrier 37. In the middle region between the hollow peg 411 and the annular collar 412, the carrier body 41 has a radially protruding collar 413, with which the carrier body 41 is inserted into a stepped bore 45 in the carrier 37, with the collar 413 braced on the annular shoulder formed between the portions of the bore. An encompassing undercut 46 is provided on the underside of the collar 413. As shown in FIGS. 6 and 8, on the underside of the collar 413, three radially protruding wedging segments 47 offset by 120° circumferentially from one another, which are wedged into the carrier 37 on the underside thereof (FIG. 8). In the wedging process, the carrier body 41 is held, oriented exactly radially, on the annular collar 412 and is then fixed in its position by the collar 413. The undercut 46 prevents the forces arising from the wedging from reaching the region of the pressure measuring cell 40 and adulterating the measurement signal.

FIG. 8 shows a fragmentary section, passing through a strain measuring element 16 of the hydraulic block 28 and the add-on ECU 20 secured to it. The pressure measuring element 16 is inserted into the carrier 37 of the pressure sensor 30; the carrier 37 is secured in the housing 31; and the pressure sensor 30 is covered by the cap 33. In the hydraulic block 28, one radial bore 50 is made, from the surface 281 oriented toward the add-on ECU 20, for each fluid conduit 29 leading to a final control element. When the add-on ECU 20 is placed on the surface 281 of the hydraulic block 28, each plug-in tube 44 of a pressure measuring element 16 passes through the associated radial bore 50 and on into the fluid conduit 29. A seal 51 through which the plug-in tube 44 passes enables a compensation for tolerances in the axial direction, so that the pressure sensor can be adjusted in such a way that the pressure measuring elements 16 rest on the level of the control circuit 22. An insertion cone 161, embodied on the free end of the plug-in tube and whose conical tip has a rounding radius, makes the penetration into and passage through the seal 51 easier. The seal 51 comprises two O-rings 52, 53, which surround the plug-in tube 44 and press on opposed sides against a support disk 54 coaxially surrounding the plug-in tube 44. The support disk 54 rests, with a radially encompassing flange 541, on an annular shoulder of the radial bore 50, which is embodied as a stepped bore, and is held down by a trap funnel 55, which surrounds the plug-in tube 44 and is inserted into the orifice opening 501 of the radial bore 50 and is retained on the hydraulic block 28 by wedging. The O-ring 52 rests in a coaxial recess 551 of the trap funnel 55, while the O-ring 53 seals off the plug-in tube 44 from the wall of the radial bore 50. In the region of the dividing point of the support disk 54 and the trap funnel 55, a transverse slit 552 is stamped in the face end of the trap funnel 55, and by way of the transverse slit, brake fluid escaping from the radial bore 50 in the event of a leak at the O-ring 53 can flow out via a relief bore 56 that discharges in the radial bore 50.

The foregoing relates to preferred exemplary embodiments of the invention, it being understood that other variants and embodiments are therefore possible within the spirit and scope of the invention, the latter being defined by the appended claims.

We claim:

1. In a brake system for motor vehicles, having electrically controlled hydraulic final control elements (17, 18, 25–27) integrated into a hydraulic block (28); having a pressure sensor (30), which has a plurality of pressure measuring elements (16) for measuring the hydraulic pressure controlled by the various final control elements (17, 18, 25–27); and having a control circuit (22) for controlling the final control elements (17, 18, 25–27), the improvement wherein the control circuit (22) and the pressure sensor (30) are accommodated in a common housing (31), on the underside of which the pressure measuring elements (16) protrude with smaller-diameter plug-in tubes (44); and wherein the housing (31) is mounted on the hydraulic block (28) and solidly joined to it by insertion of the plug-in tubes (44) into fluid conduits (29), present in the hydraulic block (28), in a fluid-tight manner.

2. The brake system of claim 1, wherein on its top side, remote from the hydraulic block (28), the housing (31) is closed by means of a detachable cap (33) that opens up the access to the control circuit (22) and the pressure sensor (30).

3. The brake system of claim 1, wherein the pressure measuring elements (16) are disposed side by side on a carrier (37) and are inserted, each with a collar (14) coaxially surrounding the plug-in tube (44), into stepped bores (45) embodied in the carrier (37) and are wedged into the carrier (37) on its underside by means of wedging segments (47) protruding radially from the underside of the collar.

4. The brake system of claim 3, wherein each collar (413) has an encompassing undercut (46) on its underside.

5. The brake system of claim 3, wherein the carrier (37) is integral with the housing (31).

6. The brake system of claim 3, wherein the carrier (37) is a separate component, secured in the housing (31).

7. The brake system of claim 3, wherein an annular collar (412) coaxially surrounding the plug-in tube (44) and integral with the collar (413) protrudes from the underside of the collar and serves to hold the pressure element (16) in the wedging operation.

8. The brake system of claim 1, wherein the sealing off of the plug-in tubes (44), protruding into the fluid conduits (29) of the hydraulic block (28), of the pressure measuring elements (16) is done in each case by means of two O-rings (52, 53), through which the plug-in tube (44) passes and which O-rings are disposed on both sides of a support disk (54) coaxially surround the plug-in tube (44).

9. The brake system of claim 8, wherein an insertion cone (161), whose tip has a rounding radius, is embodied on the free end of the plug-in tube.

10. The brake system of claim 1, wherein radial bores (50) discharging into the fluid conduits (29) are made in the hydraulic block (28), and the ends of the plug-in tubes (44) of the pressure measuring elements (16) are passed through these bores.

11. The brake system of claim 10, wherein seals (51), each made up of a support disk (54) and O-rings (52, 53), are inserted into the radial bores.

12. The brake system of claim 10, wherein one trap funnel (55), surrounding the plug-in tube (44), is inserted into each of the bore openings (501) of the radial bores (50) at the surface (281) of the hydraulic block (28).

13. The brake system of claim 11, wherein each trap funnel (55) is embodied such that it fixes the seal (51) axially nondisplaceably in the radial bore (50).

14. The brake system of claim 13, wherein the support disk (54), protruding radially past the O-rings (52, 53), is fixed axially nondisplaceably in the stepped radial bore (50).

15. The brake system of claim 14, wherein a relief bore (56) for a leakage outflow discharges in the region of the dividing point of the support disk (54) and the trap funnel (55), and that a transverse slit (552) extending toward the relief bore (56) is stamped into the face end of the trap funnel (55).

16. The brake system of claim 1, wherein the length and the inside diameter of the plug-in tubes (44) are optimized with regard to filter function and transmission property.

17. The brake system of claim 16, wherein each plug-in tube (44) has a length of approximately 60 mm, an inside diameter of more than 0.5 mm, and an outside diameter of approximately 1.6 mm.

18. The brake system of claim 1, wherein the electrical connection between the pressure measuring elements (16) and the control circuit (22), and between structural units of the control circuit (22), is done on one level by bonded connections and hybrid technology.

19. The brake system of claim 8, wherein the plug-in tubes (44) have a length such that the pressure measuring elements (16), when the ends of the plug-in tubes have dipped into the fluid conduits (29) of the hydraulic block (28), are located on the level of the control circuit (22).

20. The brake system of claim 18, wherein the plug-in tubes (44) have a length such that the pressure measuring element (16), when the ends of the plug-in tubes have dipped into the fluid conduits (29) of the hydraulic block (28), are located on the level of the control circuit (22).

21. The brake system of claim 12, wherein each trap funnel (55) is embodied such that it fixes the seal (51) axially nondisplaceably in the radial bore (50).

22. The brake system of claim 13, wherein the support disk (54), protruding radially past the O-rings (52, 53), is fixed axially nondisplaceably in the stepped radial bore (50).

* * * * *